(12) United States Patent
Osawa et al.

(10) Patent No.: US 9,607,490 B2
(45) Date of Patent: Mar. 28, 2017

(54) HAPTIC DEVICE

(71) Applicant: Sony Computer Entertainment Inc., Tokyo (JP)

(72) Inventors: Hiroshi Osawa, Kanagawa (JP); Takeshi Yamagishi, Kanagawa (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 42 days.

(21) Appl. No.: 14/425,138

(22) PCT Filed: Aug. 5, 2013

(86) PCT No.: PCT/JP2013/071177
§ 371 (c)(1),
(2) Date: Mar. 2, 2015

(87) PCT Pub. No.: WO2014/041923
PCT Pub. Date: Mar. 20, 2014

(65) Prior Publication Data
US 2015/0235530 A1     Aug. 20, 2015

(30) Foreign Application Priority Data

Sep. 13, 2012   (JP) ................. 2012-202075

(51) Int. Cl.
*H04B 3/36*     (2006.01)
*G08B 6/00*     (2006.01)
(Continued)

(52) U.S. Cl.
CPC .............. *G08B 6/00* (2013.01); *G06F 3/016* (2013.01); *G08B 21/24* (2013.01)

(58) Field of Classification Search
CPC .......... G08B 6/00; G08B 21/24; B60B 1/045; H02K 33/04; H04M 1/0202; G06F 3/016; H01F 7/66; H01F 7/122
(Continued)

(56) References Cited

U.S. PATENT DOCUMENTS 6,747,631 B1    6/2004  Sakamaki
6,816,049 B2 *  11/2004  Watanabe ............... G06F 3/016
                                                        335/222

(Continued)

FOREIGN PATENT DOCUMENTS

CN       101015825 A      8/2007
JP       2000330688 A    11/2000
(Continued)

OTHER PUBLICATIONS

International Preliminary Report on Patentability and Written Opinion for corresponding PCT application PCT/JP2013/071177, dated Mar. 26, 2015.

(Continued)

*Primary Examiner* — Anh V La
(74) *Attorney, Agent, or Firm* — Matthew B. Dernier, Esq

(57) ABSTRACT

There is provided a haptic device including a small-size haptic unit. The haptic device includes a weight, a magnet fixed to the weight, a coil that generates a magnetic field to reciprocate the magnet along a predetermined direction, and a current control unit that presents a haptic sensation to a user by controlling a current flowing in the coil to vibrate the weight.

5 Claims, 9 Drawing Sheets

(51) Int. Cl.
*G06F 3/01* (2006.01)
*G08B 21/24* (2006.01)

(58) Field of Classification Search
USPC ............ 340/407.1, 407.2; 345/163; 156/161;
310/25, 15
See application file for complete search history.

(56) References Cited

U.S. PATENT DOCUMENTS

| | | |
|---|---|---|
| 6,822,635 B2 | 11/2004 | Shahoian |
| 7,196,688 B2 | 3/2007 | Schena |
| 7,868,489 B2 | 1/2011 | Amemiya |
| 8,009,156 B2 | 8/2011 | Yatsu |
| 8,232,969 B2 | 7/2012 | Grant |
| 8,739,033 B2 | 5/2014 | Rosenberg |
| 2002/0033795 A1 | 3/2002 | Shahoian |
| 2004/0059245 A1 | 3/2004 | Watanabe |
| 2007/0146317 A1 | 6/2007 | Schena |
| 2008/0303784 A1 | 12/2008 | Yamaguchi |
| 2009/0009481 A1 | 1/2009 | Yatsu |
| 2010/0225586 A1* | 9/2010 | Cheng ............... G06F 3/016 345/163 |
| 2011/0025479 A1* | 2/2011 | Hwang ............... B06B 1/0207 340/407.1 |
| 2011/0074227 A1 | 3/2011 | Amemiya |
| 2011/0181131 A1 | 7/2011 | Pu |
| 2012/0049660 A1 | 3/2012 | Park |
| 2012/0229264 A1* | 9/2012 | Company Bosch .... G06F 3/016 340/407.1 |
| 2012/0299857 A1 | 11/2012 | Grant |
| 2014/0125470 A1 | 5/2014 | Rosenberg |

FOREIGN PATENT DOCUMENTS

| | | |
|---|---|---|
| JP | 2001-356862 A | 12/2001 |
| JP | 2002149312 A | 5/2002 |
| JP | 2003534620 A | 11/2003 |
| JP | 2004112979 A | 4/2004 |
| JP | 2004530200 A | 9/2004 |
| JP | 2005078310 A | 3/2005 |
| JP | 2005514681 A | 5/2005 |
| JP | 2008305109 A | 12/2008 |
| JP | 2009015643 A | 1/2009 |
| JP | 4551448 B2 | 9/2010 |
| JP | 2011054196 A | 3/2011 |
| JP | 2011183374 A | 9/2011 |
| WO | 0191100 A1 | 11/2001 |
| WO | 01073587 A1 | 9/2002 |
| WO | 03054849 A1 | 7/2003 |
| WO | 2007086426 A1 | 8/2007 |

OTHER PUBLICATIONS

International Search Report for corresponding PCT application PCT/JP2013/071177, dated Oct. 15, 2013.
European Search Report for corresponding EP application 13836844, 7 pages, dated Apr. 19, 2016.
Office Action for corresponding Japanese paten application 2014-535427, dated Aug. 25, 2015.
Office Action for corresponding CN Application 2013800463045, 14 pages, dated Aug. 24, 2016.

* cited by examiner

US 9,607,490 B2

HAPTIC DEVICE

TECHNICAL FIELD

The present invention relates to a haptic device.

BACKGROUND ART

The haptic device is used in order to give a user who holds or wears this device a feeling as if a force was applied in a predetermined direction. For example, by using such a haptic device as a controller of a game machine, a game with a more feeling of being present in a real world can be enjoyed. The haptic device incorporates a weight and can present a haptic sensation to the user by vibrating this weight in such a manner that the movement velocity differs between the direction in which the haptic sensation is desired to be generated and the opposite direction thereof.

SUMMARY

In the above-described haptic device, an electric motor is used as a drive mechanism for vibrating the weight. However, such a drive mechanism tends to cause increase in the size of the device. In particular, when it is desired to vibrate the weight in various directions to present a haptic sensation in the various directions, plural electric motors are necessary and the size of the device further increases.

The present invention is made in consideration of the above-described actual circumstances and one of objects thereof is to provide a haptic device including a small-size haptic unit.

A haptic device according to the present invention is characterized by including a weight, a magnet fixed to the weight, a coil that generates a magnetic field to reciprocate the magnet along a predetermined direction, and a current control unit that presents a haptic sensation to a user by controlling a current flowing in the coil to vibrate the weight.

DESCRIPTION OF EMBODIMENTS

Embodiments of the present invention will be described in detail below based on the drawings.

Figure 1:
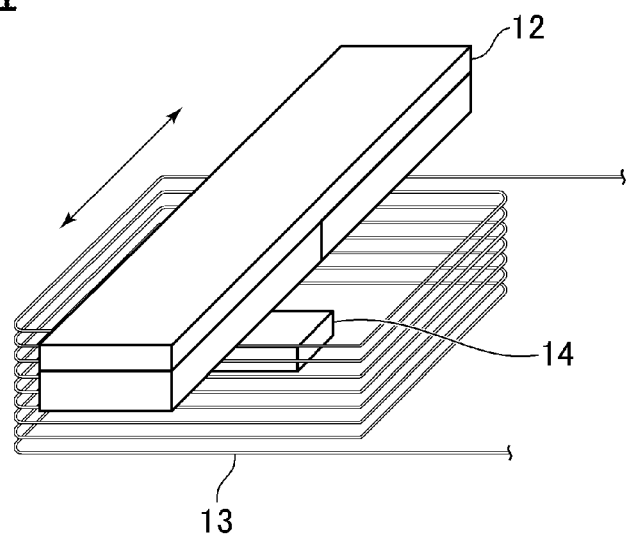
FIG. 1 is an explanatory diagram showing the operation principle of a haptic device according to an embodiment of the present invention.

First, the principle of the operation of a haptic device 1 according to one embodiment of the present invention will be described by using FIG. 1. A haptic unit incorporated in the haptic device 1 according to the present embodiment is so configured as to include a weight 11, a magnet 12, a coil 13, and a position detecting sensor 14. In FIG. 1, diagrammatic representation of the weight 11 is omitted.

The magnet 12 is a permanent magnet and is fixed to the weight 11 having a certain amount of weight. Therefore, when the magnet 12 moves in the device as described later, the weight 11 integrated with it also moves in the device in a similar manner. In the present embodiment, the magnet 12 has a shape of a bar extending along a predetermined direction. One end thereof is an S-pole and the other end is an N-pole.

The coil 13 generates a magnetic field for reciprocating the magnet 12. Specifically, when the direction and magnitude of a current flowing in the coil 13 change, the magnetic field generated by the coil 13 changes according to this. The magnet 12 moves according to this change in the magnetic field. Furthermore, it is also possible to control the movement velocity of the magnet 12 by controlling the magnitude of the current flowing in the coil 13. As shown by arrows in FIG. 1, the magnet 12 is so disposed as to reciprocate in the direction corresponding with its extension direction.

The position detecting sensor 14 detects the position of the magnet 12. For example, if the position detecting sensor 14 is a Hall element, it detects the position of the magnet 12 by detecting a magnetic field generated due to the magnet 12. By changing the current made to flow in the coil 13 according to a detection result of this position detecting sensor 14, the weight 11 can be vibrated with high accuracy.

By repeating control in which the weight 11 is rapidly moved toward one side along the extension direction of the magnet 12 and is slowly moved in the opposite direction, the haptic device 1 can cause a user to feel a sensation as if a force was applied to this device toward the direction in which the weight 11 rapidly moves. Hereinafter, this direction in which the user feels the force will be referred to as the haptic sensation generation direction.

Figure 2A:
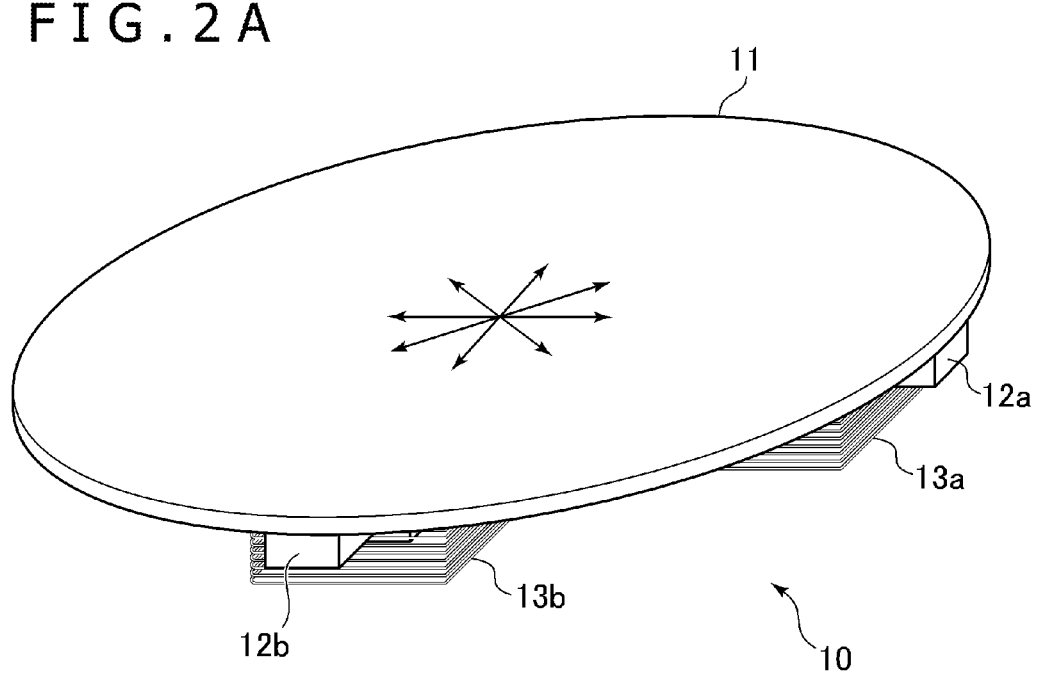
FIG. 2A is a configuration diagram of a haptic unit incorporated in the haptic device according to the embodiment of the present invention.
Figure 2B:
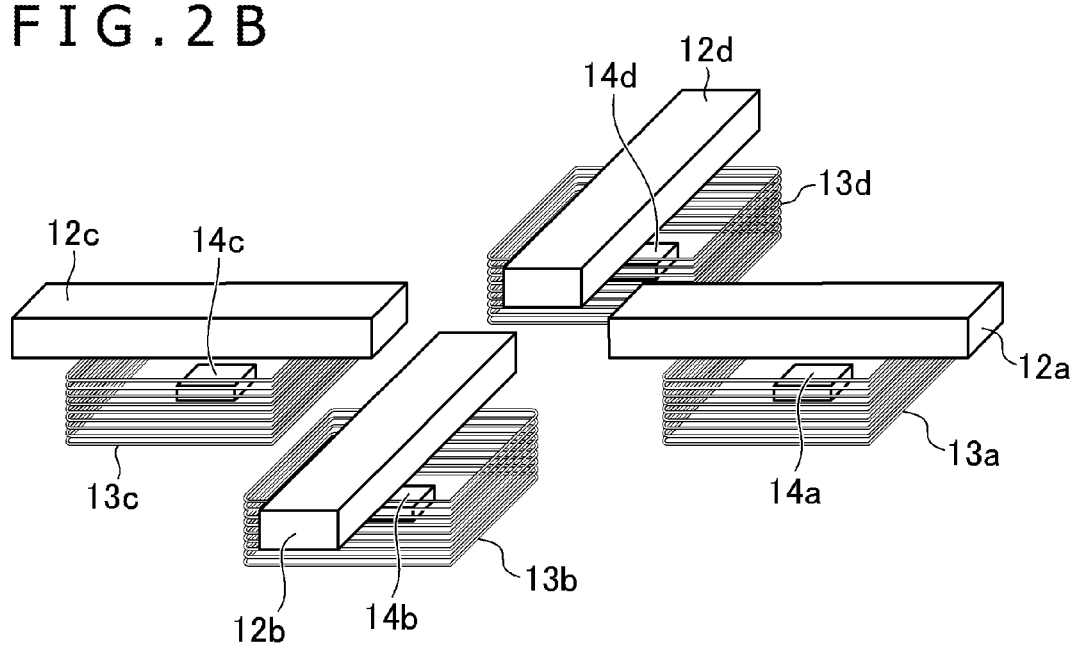
FIG. 2B is a diagram showing other constituent elements than a weight in the haptic unit of FIG. 2A.

Next, the configuration of a haptic unit 10 incorporated in the haptic device 1 according to the present embodiment will be described by using FIGS. 2A and 2B. In the present embodiment, the haptic unit 10 includes four magnets 12a to 12d and includes four coils 13a to 13d corresponding to these. Furthermore, position detecting sensors 14a to 14d are each disposed at the center of a respective one of these four coils 13a to 13d. FIG. 2A shows the overall configuration of the haptic unit 10 including the weight 11 and FIG. 2B shows the other constituent elements than the weight 11 in order to show the positional relationship among the respective constituent elements other than the weight 11.

The four magnets 12a to 12d are all fixed to the same weight 11 and the weight 11 and the magnets 12a to 12d integrally move in the device. Furthermore, the magnets 12a to 12d all have a bar shape and are so disposed that their extension directions are parallel to a predetermined plane. As described later, the weight 11 vibrates in a direction parallel to this predetermined plane. Therefore, the haptic device 1 presents a haptic sensation with employment of any direction in this predetermined plane as the haptic sensation generation direction. Hereinafter, this plane including the vibration directions of the weight 11 will be referred to as the vibration plane. The respective magnets 12 are disposed along a circumference centered at the centroid of the weight 11 at equal intervals from each other in such a manner as to extend in a direction parallel to the vibration plane from the centroid of the weight 11 radially.

The coils 13a to 13d are so disposed as to correspond to the magnets 12a to 12d in a one-to-one relationship. That is, each coil 13 is disposed below the corresponding magnet 12 and generates a magnetic field to reciprocate the corresponding magnet 12 along one direction in the vibration plane. The direction in which each magnet 12 reciprocates by the corresponding coil 13 here corresponds with the direction toward the centroid of the weight 11 (i.e. extension direction of this magnet 12). Furthermore, the position detecting sensors 14a to 14d each detect the position of the corresponding magnet 12.

The haptic device 1 moves the magnets 12a to 12d along the respective extension directions at arbitrary velocity by simultaneously controlling the current flowing in each of the coils 13a to 13d. At this time, the weight 11 moves along a direction indicated by a resultant vector obtained by synthesizing the movement vectors of the respective magnets 12. Thus, the haptic device 1 can vibrate the weight 11 in an arbitrary direction of 360 degrees as a direction parallel to the vibration plane by reciprocating two or more magnets 12 along directions different from each other in the vibration plane. This allows the haptic device 1 to employ any direction in the vibration plane as the haptic sensation generation direction.

Figure 3:
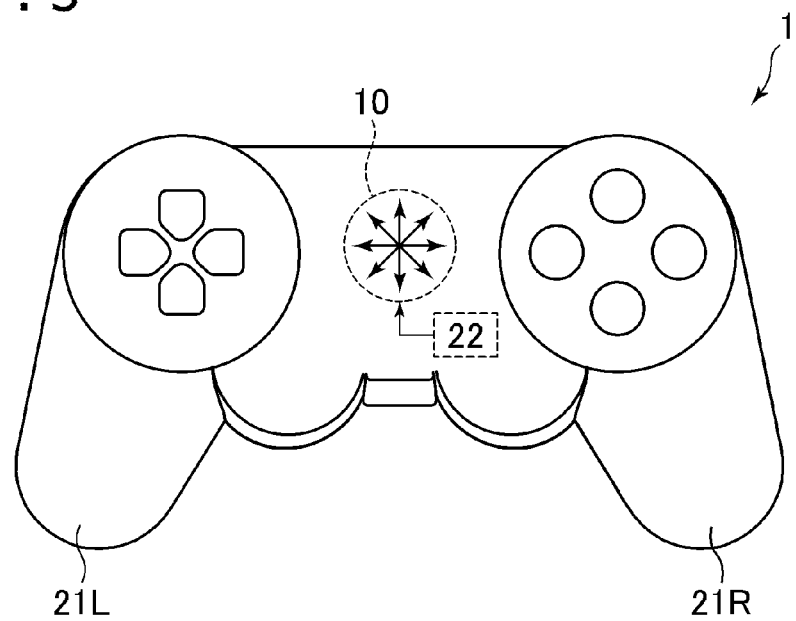
FIG. 3 is a diagram showing the schematic configuration of the haptic device according to the embodiment of the present invention.

Next, the schematic configuration of the haptic device 1 according to the present embodiment will be described by using FIG. 3. Here, suppose that the haptic device 1 is a controller of a home-use game machine. The casing of the haptic device 1 includes grip parts 21R and 21L on the right and left sides. A user holds these grip parts 21R and 21L with both hands to use the haptic device 1. At substantially the center of the casing between these grip parts 21R and 21L, the haptic unit 10 like that shown in FIG. 2A is disposed.

A current control unit 22 is disposed in the casing of the haptic device 1 and the haptic unit 10 operates based on control by this current control unit 22. Specifically, according to a control command received from the external home-use game machine, the current control unit 22 controls the current flowing in each of the coils 13a to 13d to vibrate the weight 11 along a haptic sensation generation direction indicated by the control command. This allows the user holding the haptic device 1 with both hands to feel a sensation as if a force was applied toward the haptic sensation generation direction.

Here, a specific example of the control command given to the current control unit 22 will be described. As described above, the haptic sensation presentation operation by the haptic unit 10 is realized through reciprocation motion of the weight 11 along a trajectory straight line passing through the centroid of the weight 11 when the weight 11 is still. Details of the motion of the weight 11 are defined by a waveform indicating the position of the weight 11 during this reciprocation motion and an angle a representing the inclination relative to a reference direction (0-degree direction) of the trajectory straight line. Waveform data that defines the waveform indicating the position of the weight 11 is referred to as position waveform data. Furthermore, waveform data that defines the angle a is referred to as angle waveform data. These waveform data are given by e.g. a data file of a way format (RIFF waveform Audio Format). Inputting the control command including these waveform data to the current control unit 22 can make the haptic unit 10 carry out haptic sensation presentation with arbitrary direction and intensity. Regarding the angle a, an angle value (any numerical value of 0 degrees to 360 degrees) may be directly input to the current control unit 22 instead of the angle waveform data.

Figure 4:
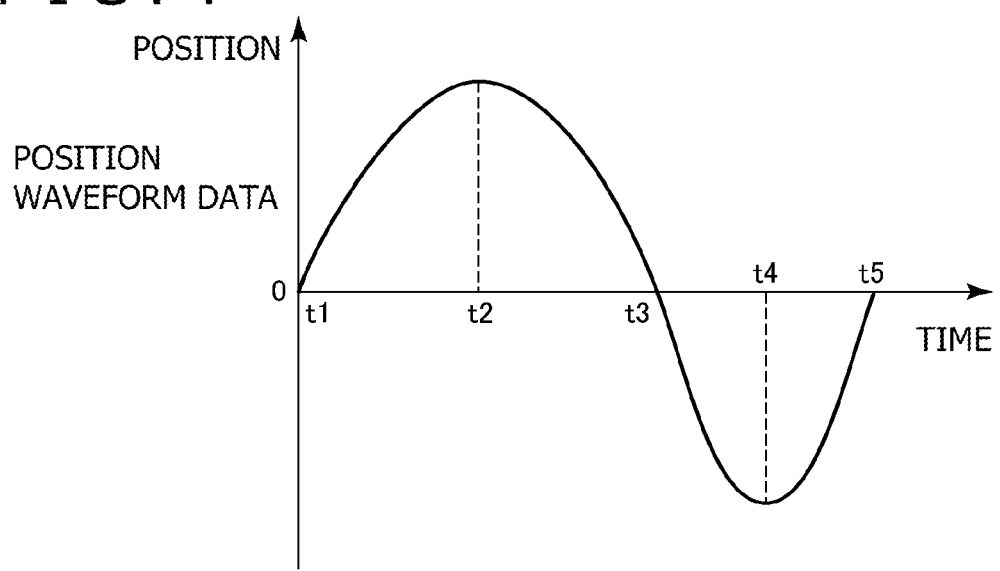
FIG. 4 is a diagram showing one example of waveform data input in order to control the haptic unit.
Figure 4:
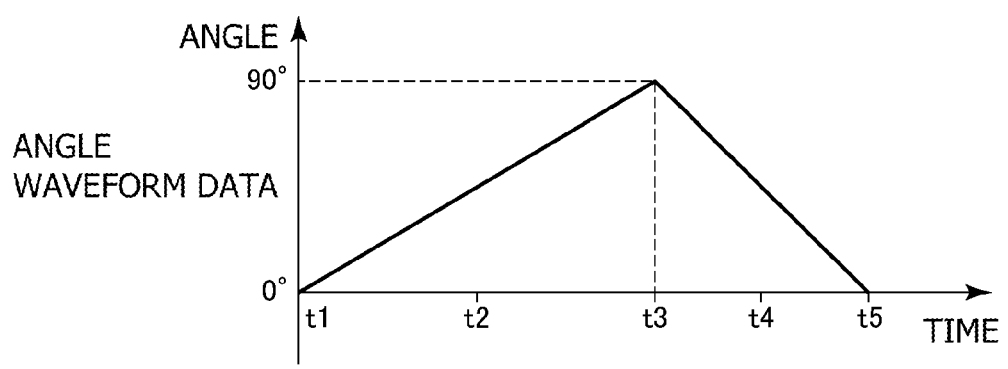
Figure 5:
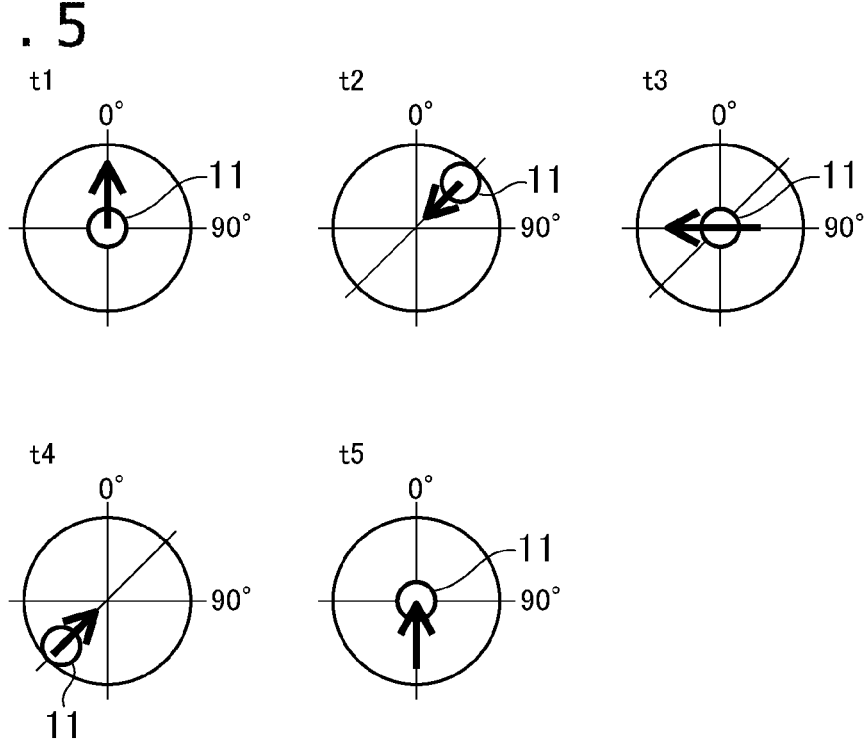
FIG. 5 is a diagram for explaining the movement direction of the weight when the waveform data shown in FIG. 4 is input.
Figure 6:
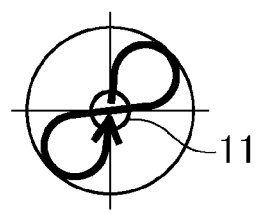
FIG. 6 is a diagram for explaining the trajectory of the weight when the waveform data shown in FIG. 4 is input.

FIG. 4 shows a specific example of the position waveform data and the angle waveform data. Furthermore, FIG. 5 shows the movement direction of the weight 11 at respective timings of t1 to t5 when the waveform data shown in FIG. 4 is input. Moreover, FIG. 6 shows the trajectory of the weight 11 in the period from t1 to t5.

According to the haptic device 1 in accordance with the present embodiment described above, the weight 11 is formed integrally with the magnet 12 and the coil 13 directly reciprocates the magnet 12 to thereby present a haptic sensation to a user. Therefore, the thickness and size of the haptic unit 10 can be reduced compared with conventional haptic devices that convert rotational motion by an electric motor to linear motion. In particular, according to the haptic device 1 in accordance with the present embodiment, due to inclusion of two or more magnets 12 that are so disposed as to reciprocate along directions different from each other, a haptic sensation can be presented in any direction of 360 degrees with suppression of the thickness of the haptic unit 10.

Figure 7:
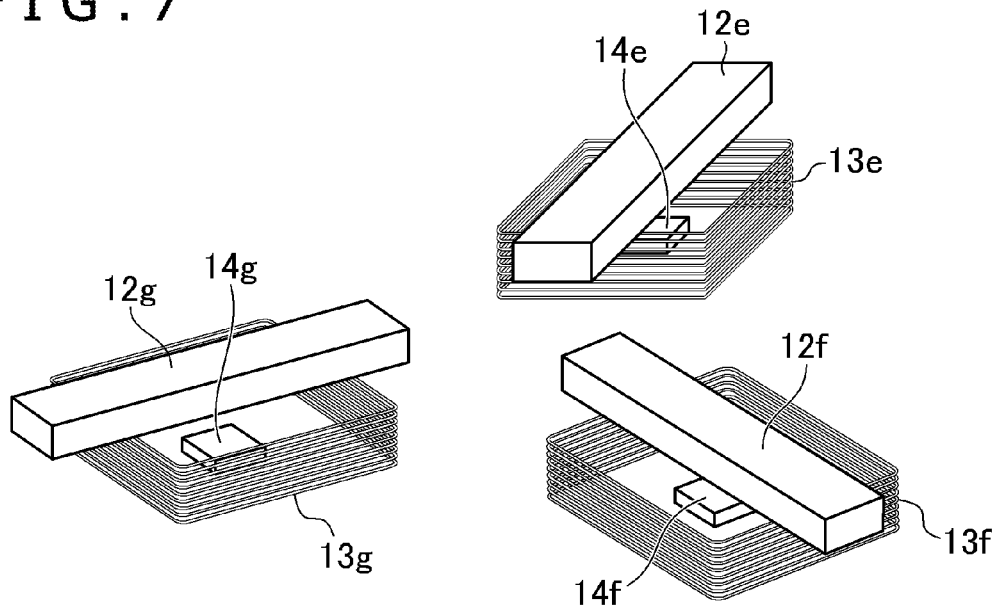
FIG. 7 is a diagram showing a modification example of the haptic unit.

The embodiment of the present invention is not limited to the above-described one. For example, although it is assumed that the haptic unit 10 is formed with the four magnets 12 and the four coils 13 in the above description, the numbers of magnets 12 and coils 13 are not limited thereto. FIG. 7 is a diagram showing a modification example of the haptic unit 10. The haptic unit 10 according to this FIG. 7 is so configured as to include three magnets 12e to 12g, three coils 13e to 13g, and three position detecting sensors 14e to 14g. Although diagrammatic representation of the weight 11 is omitted also in FIG. 7 as with FIG. 2B, the three magnets 12e to 12g are fixed to the same weight 11 in practice. Here, the three magnets 12e to 12g all have a bar shape and are disposed along a circumference centered at the centroid of the weight 11 at equal intervals from each other in such a manner as to extend from the centroid of the weight 11 radially in the vibration plane. Also in the example of this diagram, the haptic device 1 can vibrate the weight 11 in an arbitrary direction in the vibration plane by controlling the current flowing in each of the three coils 13e to 13g at the same time.

Furthermore, although it is assumed that the weight 11 moves only in the vibration plane in the above description, the haptic device 1 may further include a mechanism that reciprocates the weight 11 along the direction orthogonal to the vibration plane. Hereinafter, the direction orthogonal to the vibration plane of the haptic unit 10 will be referred to as the orthogonal direction and the mechanism that moves the weight 11 along the orthogonal direction will be referred to as a vertical motion mechanism 24. Suppose that this vertical motion mechanism 24 moves not only the weight 11 but the whole of the haptic unit 10 shown in FIG. 2A along the orthogonal direction.

Figure 8:
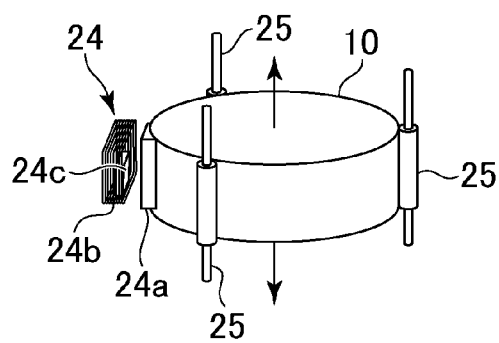
FIG. 8 is a diagram showing one example of a vertical motion mechanism.

FIG. 8 is a diagram schematically showing one example of such a vertical motion mechanism 24. In the example of this diagram, linear guides 25 extending along the orthogonal direction are so provided as to surround the haptic unit 10. By these linear guides 25, the movement direction of the whole of the haptic unit 10 is restricted to the orthogonal direction. Moreover, in the example of FIG. 8, the vertical motion mechanism 24 formed of a magnet 24*a*, a coil 24*b*, and a position detecting sensor 24*c* is disposed in the haptic device 1. The magnet 24*a*, the coil 24*b*, and the position detecting sensor 24*c* move the whole of the haptic unit 10 along the orthogonal direction based on an operation principle similar to that of the magnet 12, the coil 13, and the position detecting sensor 14 used in order to move the weight 11 in the haptic unit 10. Specifically, the magnet 24*a* is fixed to the side surface of the haptic unit 10 with an orientation along the orthogonal direction and moves along the orthogonal direction by a magnetic field generated by the coil 24*b*. This allows the haptic device 1 to reciprocate the whole of the haptic unit 10 along the orthogonal direction and present a haptic sensation in a direction along the orthogonal direction to a user.

Figure 9:
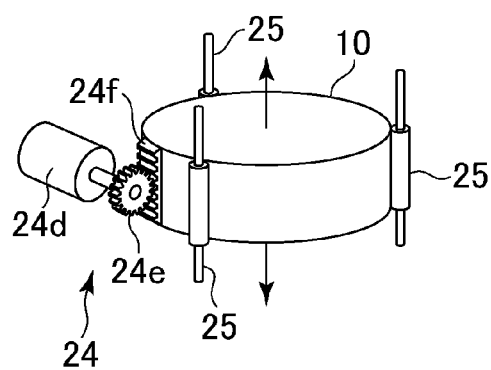
FIG. 9 is a diagram showing another example of the vertical motion mechanism.

FIG. 9 is a diagram showing another example of the vertical motion mechanism 24. Also in the example of this diagram, the linear guides 25 are so disposed as to surround the haptic unit 10 similarly to FIG. 8. Furthermore, as the vertical motion mechanism 24, a motor 24*d*, a gear 24*e*, and a rack 24*f* are disposed. The gear 24*e* is attached to the rotation shaft of the motor 24*d* and rotates in association with the rotation of the motor 24*d*. The rack 24*f* is fixed to the side surface of the haptic unit 10 with an orientation along the orthogonal direction similarly to the magnet 24*a* in the example of FIG. 8. The gear 24*e* and the rack 24*f* are so disposed as to mesh with each other and the rack 24*f* linearly moves along the orthogonal direction by the rotation of the gear 24*e*. This allows the haptic device 1 to reciprocate the whole of the haptic unit 10 along the orthogonal direction by rotating the motor 24*d*.

Figure 10:
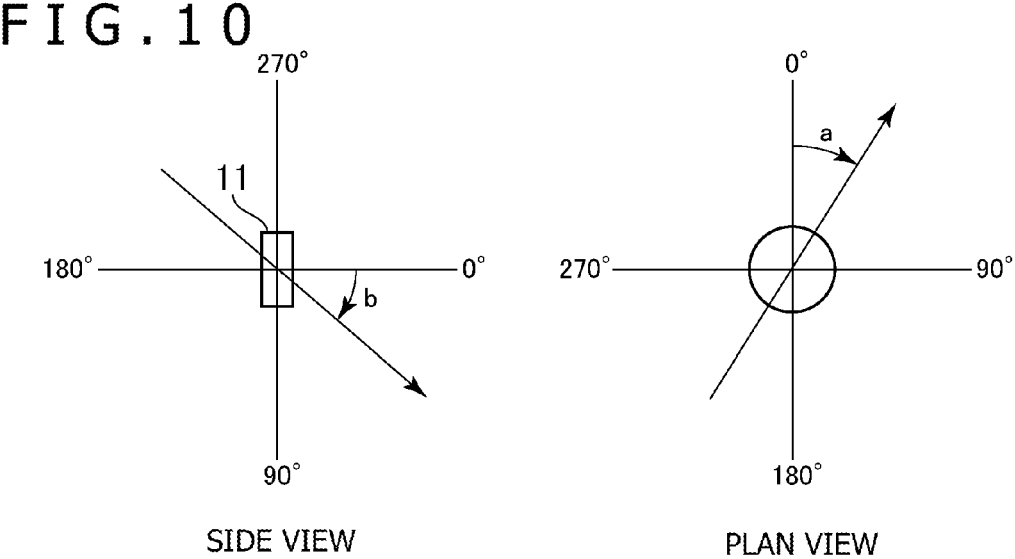
FIG. 10 is an explanatory diagram of angles a and b to identify the direction of a trajectory straight line.

By including such a vertical motion mechanism 24 and controlling the movement of the weight 11 in combination with movement in the vibration plane, the haptic device 1 can move the weight 11 not only in the vibration plane but in an arbitrary direction in a three-dimensional space. In the case of specifying the position of the weight 11 in the three-dimensional space, information on an angle b representing the inclination of the trajectory straight line relative to a reference plane needs to be input to the current control unit 22 in addition to the angle a representing the direction in the vibration plane. This angle b is a parameter representing the inclination (i.e. angle of elevation or angle of depression) of the trajectory straight line of the weight 11 relative to the reference plane. The angle b may be input to the current control unit 22 as the angle waveform data similarly to the angle a or may be input to the current control unit 22 as numerical data of the angle. FIG. 10 shows the relationship between the angle a and the angle b.

Figure 11:
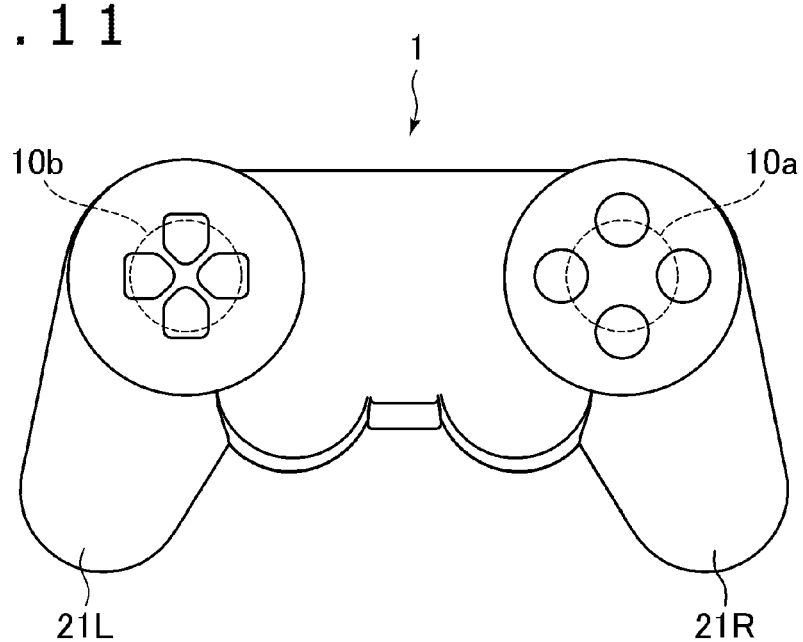
FIG. 11 is a diagram showing one example of a haptic device incorporating two haptic units.

Furthermore, the haptic device 1 may include plural haptic units 10. FIG. 11 shows a configuration when two haptic units 10*a* and 10*b* are disposed in a casing having the same shape as that in FIG. 3. In this diagram, the haptic unit 10*a* is disposed on the viewer's right side of the casing and the haptic unit 10*b* is disposed on the left side. If these haptic units 10 present haptic sensations toward the same haptic sensation generation direction, a user can be made to feel a sensation of application of a force intending to move the haptic device 1 parallel toward this haptic sensation generation direction. Furthermore, through presentation of haptic sensations in directions opposite to each other by these haptic units 10 (e.g. the upward direction by the haptic unit 10*a* and the downward direction by the haptic unit 10*b*), the user can be made to feel a sensation of application of a force intending to rotate the haptic device 1.

Figure 12:
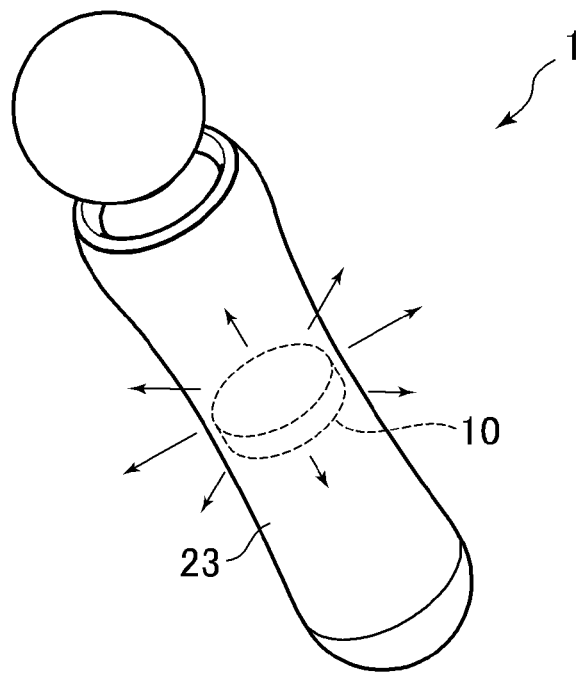
FIG. 12 is a diagram showing the schematic configuration of a haptic device according to another embodiment of the present invention.
Figure 13:
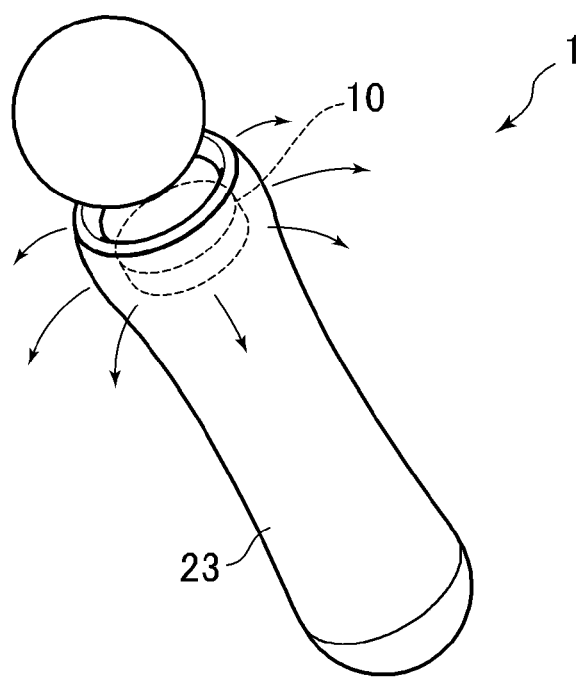
FIG. 13 is a diagram showing the schematic configuration of a haptic device according to further another embodiment of the present invention.

FIGS. 12 and 13 show other examples of the shape of the haptic device 1. In these examples, the haptic device 1 has a bar shape as a whole and is so designed as to be used with a grip part 23 in the vicinity of the center thereof held by a user. Furthermore, in both of FIGS. 12 and 13, the haptic unit 10 is disposed in the casing in such a manner that the vibration plane intersects the extension direction of the haptic device 1. In the example of FIG. 12, the haptic unit 10 is disposed at a position near the grip part 23. Through presentation of a haptic sensation by this haptic unit 10, the user can be made to feel a sensation of application of a force intending to move the whole of the haptic device 1 parallel. In addition, in the example of FIG. 13, the haptic unit 10 is disposed near an end part of the haptic device 1 separate from the grip part 23. Through presentation of a haptic sensation by this haptic unit 10 in a state in which the user holds the grip part 23, the user can be made to feel a sensation of application of a force intending to rotate the haptic device 1 with the grip part 23 being a fulcrum.

Furthermore, although it is assumed that the haptic device 1 is a controller of a home-use game machine in the above description, the haptic device according to the embodiment of the present invention is not limited thereto and may be various kinds of devices held by a user with a hand to be used, such as e.g. portable game machines and smartphones. Alternatively, the haptic device 1 may be a device that is so used as to be brought into contact with a user's body by the user, such as e.g. head-mounted displays. In the following, description will be made about a configuration example when the present invention is applied to a head-mounted display mounted on a head by the user to be used.

Figure 14:
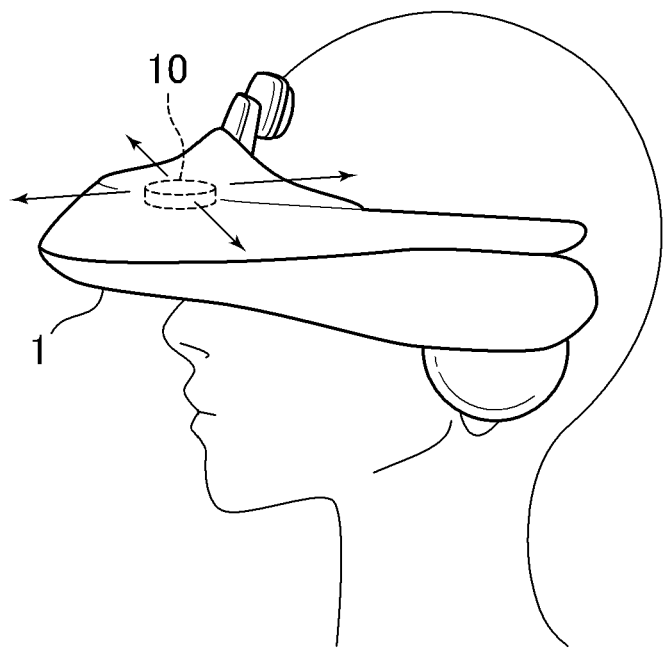
FIG. 14 is a diagram showing a configuration example when the present invention is applied to a head-mounted display.
Figure 15:
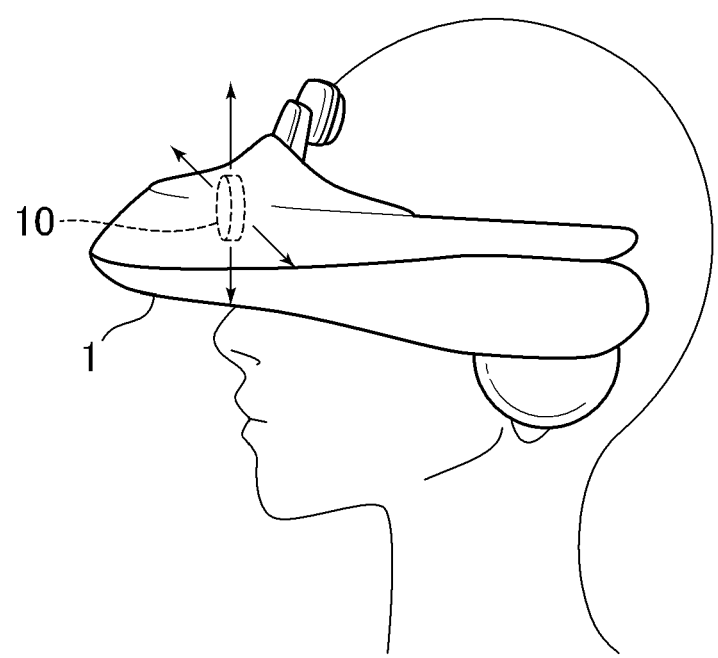
FIG. 15 is a diagram showing another configuration example when the present invention is applied to a head-mounted display.

FIGS. 14 and 15 both show a situation in which a user wears the haptic device 1 as the head-mounted display. In the example of FIG. 14, the haptic unit 10 is disposed at substantially the center of the device (front side of the forehead of the user) with such an orientation that its vibration plane is parallel to the horizontal plane. In the example of this diagram, the user can be made to feel a sensation of application of a force in e.g. the front-rear direction or the left-right direction of the head-mounted display as viewed from the user. FIG. 15 shows an example when the haptic unit 10 is disposed with a different orientation from FIG. 14. In the example of this diagram, the placement position of the haptic unit 10 is the same as that in the case of FIG. 14 but the haptic unit 10 is disposed in the device with such an orientation that the vibration plane is orthogonal to the horizontal plane. Therefore, the user can be made to feel a sensation of application of a force in e.g. the upward-downward direction or the left-right direction as viewed from the user.

Figure 16:
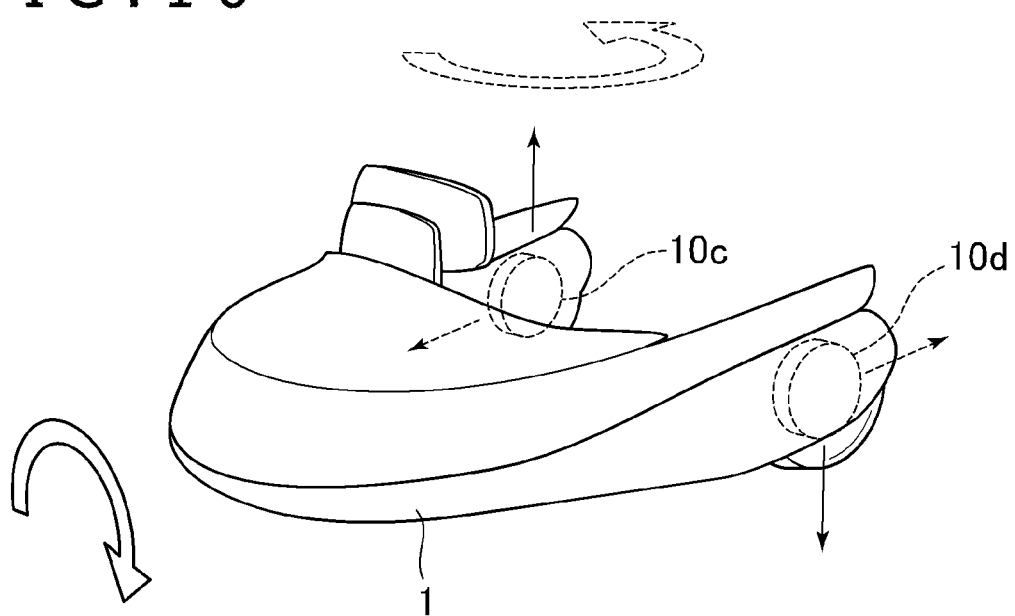
FIG. 16 is a diagram showing further another configuration example when the present invention is applied to a head-mounted display.

FIG. 16 shows an example when two haptic units 10*c* and 10*d* are disposed in the haptic device 1 as a head-mounted display. In FIG. 16, the haptic unit 10*c* is disposed on the right side as viewed from a user who wears the head-mounted display (near the right ear) and the haptic unit 10*d* is disposed on the left side (near the left ear) with such orientations that the vibration planes of both are orthogonal to the horizontal plane. Furthermore, the vibration planes of the two haptic units 10 are parallel to each other. Here, if the two haptic units 10*c* and 10*d* present haptic sensations toward the same haptic sensation generation direction, the user can be made to feel a sensation of application of a force intending to move the haptic device 1 parallel toward this haptic sensation generation direction. In addition, through presentation of haptic sensations in directions opposite to each other by these haptic units 10, the user can be made to feel a sensation of application of a force intending to rotate the haptic device 1. As a specific example, when the haptic unit 10*c* presents a haptic sensation toward the vertical upper side and the haptic unit 10*d* presents a haptic sensation toward the vertical lower side as shown by solid arrows in the diagram, the user can be made to feel a sensation of application of a force intending to rotate the user in the clockwise direction as viewed from the front side as shown by a solid block arrow. In addition, when the haptic unit 10*c* presents a haptic sensation toward the front side of the user and the haptic unit 10*d* presents a haptic sensation toward the rear side of the user as shown by dashed arrows in the diagram, the user can be made to feel a sensation of application of a force intending to rotate the user in the anticlockwise direction as viewed from the upper side (intending to rotate the user in the left direction) as shown by a dashed block arrow.

The invention claimed is:

1. A haptic device comprising:
 a weight;
 a plurality of magnets, each of the plurality of magnets being elongate in a respective longitudinal axis, and each of the plurality of magnets being fixed to the weight such that at least two of the respective longitudinal axes extend parallel to a predetermined plane and intersect at a point of intersection;
 a plurality of coils, each coil being arranged in correspondence to a respective one of the plurality of magnets and each coil generating a respective magnetic field to reciprocate the respective one of the magnets along a respective direction parallel to the predetermined plane; and
 a current control unit that presents a haptic sensation to a user by controlling a respective current flowing in each of the plurality of coils in order to reciprocate one or more of the plurality of magnets along one or more of the respective directions parallel to the predetermined plane in order to vibrate the weight in the one or more of the respective directions parallel to the predetermined plane.

2. The haptic device according to claim 1, wherein the current control unit presents the haptic sensation to the user by controlling the respective current flowing in each of the plurality of coils in order to move the at least one of the plurality of magnets: (i) in a first direction among the one or more respective directions over a first distance, (ii) in a second direction, opposite to the first direction, over a second distance, and (iii) more quickly in the first direction than in the second direction.

3. The haptic device according to claim 2, wherein:
 each of the plurality of magnets is fixed to the weight at equally spaced intervals along a circumferential arc, and each of the plurality of magnets are directed radially inwardly from the circumferential arc such that all of the respective longitudinal axes extend parallel to the predetermined plane and intersect at the point of intersection,
 the point of intersection is located at a centroid of the weight,
 each of the plurality of coils generates the respective magnetic field to reciprocate the respective one of the magnets along the respective direction parallel to the predetermined plane and toward the centroid of the weight.

4. The haptic device according to claim 2, further comprising a mechanism that reciprocates the weight along a direction orthogonal to the predetermined plane.

5. A haptic device comprising:
 a weight;
 a magnet fixed to the weight;
 a coil that generates a magnetic field to reciprocate the magnet along a predetermined axis; and
 a current control unit that presents a haptic sensation to a user by controlling a current flowing in the coil in order to move the magnet: (i) in a first direction along the predetermined axis over a first distance, and (ii) in a second direction, opposite to the first direction, over a second distance, and (iii) more quickly in the first direction than in the second direction.

* * * * *